United States Patent
Baughman et al.

(10) Patent No.: US 10,353,385 B2
(45) Date of Patent: *Jul. 16, 2019

(54) ENHANCED EMERGENCY REPORTING SYSTEM

(71) Applicant: International Business Machines Corporation, Armonk, NY (US)

(72) Inventors: Aaron K. Baughman, Silver Spring, MD (US); Oded Dubovsky, Haifa (IL); James R. Kozloski, New Fairfield, CT (US); Boaz Mizrachi, Haifa (IL); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/146,242

(22) Filed: Sep. 28, 2018

(65) Prior Publication Data

US 2019/0033841 A1 Jan. 31, 2019

Related U.S. Application Data

(63) Continuation of application No. 14/692,245, filed on Apr. 21, 2015, now Pat. No. 10,162,345.

(51) Int. Cl.
*G05B 23/02* (2006.01)
*G06Q 10/10* (2012.01)
(Continued)

(52) U.S. Cl.
CPC ....... *G05B 23/027* (2013.01); *G05B 23/0286* (2013.01); *G06Q 10/10* (2013.01);
(Continued)

(58) Field of Classification Search
CPC .................. G06F 17/30867; H04H 20/14
(Continued)

(56) References Cited

U.S. PATENT DOCUMENTS 10,162,345 B2 * 12/2018 Baughman ........... G05B 23/027
2006/0265489 A1 11/2006 Moore
(Continued)

FOREIGN PATENT DOCUMENTS

| WO | 2006011162 | 2/2006 |
| WO | 2009089116 | 7/2009 |
| WO | 2011015878 | 2/2011 |

OTHER PUBLICATIONS

B. Rosen et al., "Best Current Practice for Communications Services in Support of Emergency Calling (RFC6881)", IP.com, No. 000225837, Mar. 1, 2013, pp. 1-57.
(Continued)

*Primary Examiner* — Michael J Brown
(74) *Attorney, Agent, or Firm* — Law Office of Jim Boice

(57) ABSTRACT

A method enhances an emergency reporting system for controlling equipment. A message receiver receives an electronic message from a person. The electronic message is a report regarding an emergency event related to equipment. One or more processors identify a profile of the person who sent the electronic message, and determine a bias of the person regarding the emergency event based on the person's profile. One or more processors amend, based on the bias of the person, a content of the electronic message to create a modified electronic message regarding the emergency event. The message receiver detects that the modified electronic message came from an unauthorized source. A local controller on the equipment, in response to detecting that the modified electronic message came from the unauthorized
(Continued)

source, automatically isolates the equipment from remote control signals for controlling the equipment.

20 Claims, 5 Drawing Sheets

(51) Int. Cl.
    *G06Q 30/02*     (2012.01)
    *G08B 25/00*     (2006.01)
    *H04H 20/14*     (2008.01)

(52) U.S. Cl.
    CPC ............ *G06Q 30/02* (2013.01); *G08B 25/00* (2013.01); *G08B 25/001* (2013.01)

(58) Field of Classification Search
    USPC ........................................................ 700/49
    See application file for complete search history.

(56) References Cited

U.S. PATENT DOCUMENTS

| | | |
|---|---|---|
| 2007/0094034 A1 | 4/2007 | Berlin |
| 2008/0091515 A1 | 4/2008 | Theiberger |
| 2008/0270197 A1 | 10/2008 | Rafter et al. |
| 2009/0013054 A1 | 1/2009 | Libbey |
| 2010/0274791 A1 | 10/2010 | Chow et al. |
| 2012/0047187 A1 | 2/2012 | Daus |
| 2013/0046727 A1 | 2/2013 | Jones |
| 2013/0060729 A1 | 3/2013 | Massey |
| 2013/0141460 A1 | 6/2013 | Kane-Esrig |
| 2013/0159330 A1 | 6/2013 | Smith |
| 2014/0253946 A1 | 9/2014 | Sato |
| 2014/0359008 A1 | 12/2014 | Finney |

OTHER PUBLICATIONS

Anonymous, "Method and System for Predicting and Assigning Emergency Personnel Based on Input Sources", IP.com, No. 000239182, Oct. 20, 2014, pp. 1-3.

H. Schulzrinne et al., "Requirements for Emergency Context Resolution with Internet Technologies (RFC5012)", IP.com, No. 000166278, Jan. 8, 2008, pp. 1-25.

List of IBM Patents and Patent Applications Treated as Related, Sep. 28, 2018.

U.S. Appl. No. 14/692,245—Non-Final Office Action dated Sep. 15, 2017.

* cited by examiner

ENHANCED EMERGENCY REPORTING SYSTEM

BACKGROUND

The present disclosure relates to the field of controlling equipment, and specifically to the field of controlling equipment in response to disaster events. Still more particularly, the present disclosure related to utilizing reports from an emergency reporting system to control equipment.

SUMMARY

In an embodiment of the present invention, a method enhances an emergency reporting system for controlling equipment. A message receiver receives an electronic message from a person. The electronic message is a report regarding an emergency event related to equipment. One or more processors identify a profile of the person who sent the electronic message, and determine a bias of the person regarding the emergency event based on the person's profile. One or more processors amend, based on the bias of the person, a content of the electronic message to create a modified electronic message regarding the emergency event. The message receiver detects that the modified electronic message came from an unauthorized source. A local controller on the equipment, in response to detecting that the modified electronic message came from the unauthorized source, automatically isolates the equipment from remoted control signals for controlling the equipment.

In one or more embodiments, the method described above is implemented as a computer program product and/or a computer system.

DETAILED DESCRIPTION

Figure 1:
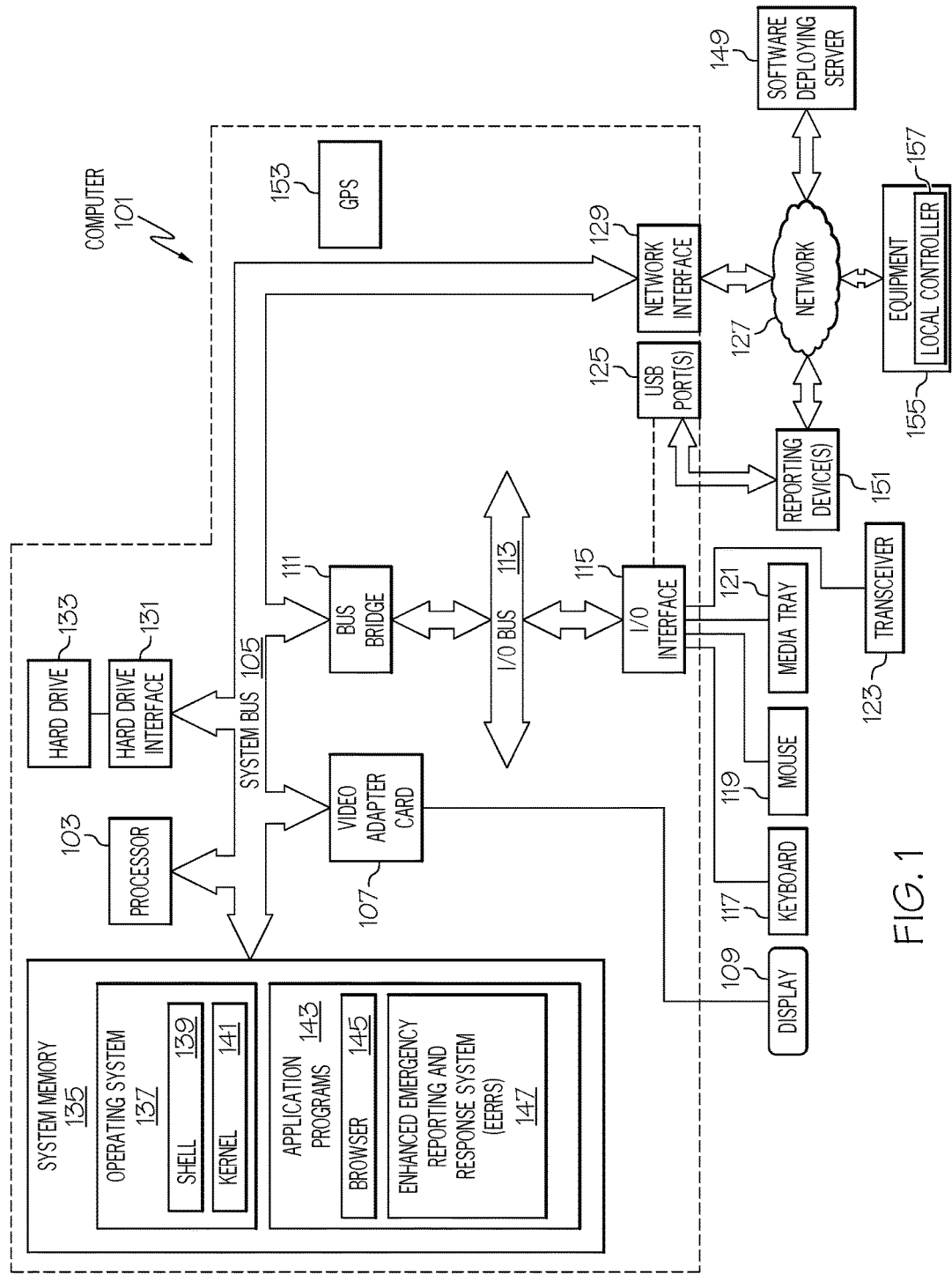
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 101 may be utilized by software deploying server 149, reporting device(s) 151, equipment 155, and/or local controller 157 shown in FIG. 1; control system 201, mass media news report server 218, reporting devices 251a-251n, and local controller 257 in FIG. 2; and/or concept mapper 311 shown in FIG. 3.

Exemplary computer 101 includes a processor 103 that is coupled to a system bus 105. Processor 103 may utilize one or more processors, each of which has one or more processor cores. A video adapter card 107, which drives/supports a display 109, is also coupled to system bus 105. In one or more embodiments of the present invention, video adapter card 107 is a hardware video card. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149, using a network interface 129. Network interface 129 is a hardware network interface, such as a network interface card (NIC), etc. Network 127 may be an external network such as the Internet, or an internal network such as an Ethernet or a virtual private network (VPN).

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other computer systems.

Application programs 143 in computer 101's system memory (as well as software deploying server 149's system memory) also include an enhanced emergency reporting and response system (EERRS) 147. EERRS 147 includes code for implementing the processes described below, including those described in FIGS. 2-5. In one embodiment, computer 101 is able to download EERRS 147 from software deploying server 149, including in an on-demand basis, wherein the code in EERRS 147 is not downloaded until needed for execution. Note further that, in one embodiment of the present invention, software deploying server 149 performs all of the functions associated with the present invention (including execution of EERRS 147), thus freeing computer 101 from having to use its own internal computing resources to execute EERRS 147.

In one or more embodiments of the present invention, computer 101 includes a geographic locator, such as a global positioning system (GPS) device 153 that utilizes signals from GPS satellites to determine the current geophysical/geographic position of the computer 101.

Note that the hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
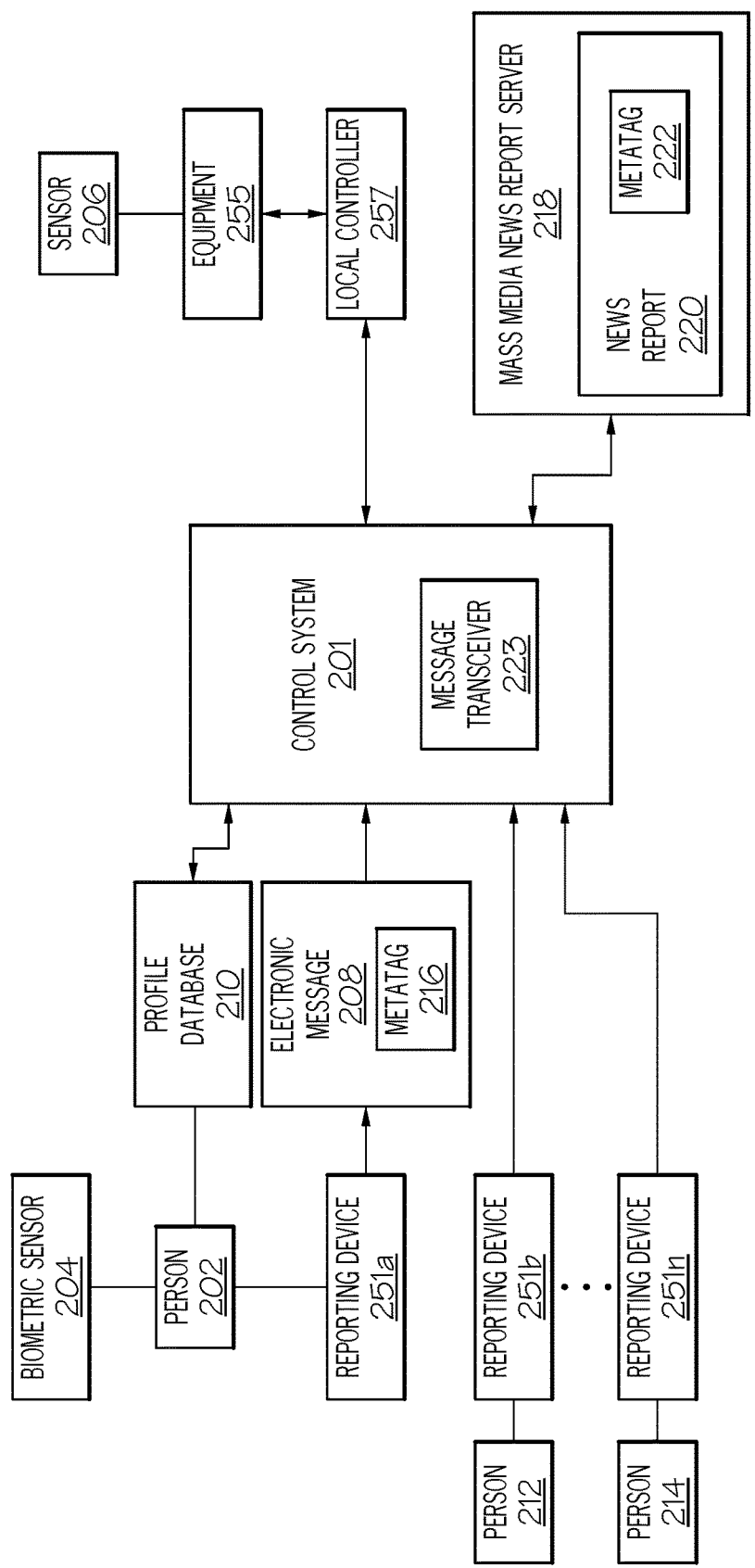
FIG. 2 illustrates an exemplary control system that controls equipment based on reports received from reporting devices.

With reference now to FIG. 2, an exemplary control system 201 (analogous to computer 101 shown in FIG. 1) that controls equipment 255 (analogous to equipment 155 shown in FIG. 1) based on reports received from reporting devices 251a-251n (analogous to reporting device(s) 151 shown in FIG. 1, and where "n" is an integer) is presented.

As shown in exemplary manner in FIG. 2, a person 202 uses a reporting device 251a to send an electronic message/report (depicted as electronic message 208) to a control system 201, which has a message transceiver 223 (analogous to transceiver 123 shown in FIG. 1, which may be networked, wireless, and/or hard wired). In one example, the electronic message 208 from the person 202 is a report on a disaster event that the person 202 is witnessing/experiencing. Electronic message 208 may be an e-mail, text message or any other type of electronically formatted messages. The disaster event may be natural (e.g., an earthquake, a flood, a hurricane, a volcanic eruption, etc.), caused directly by man (e.g., a riot, civil unrest, etc.), or the result of technological failure (e.g., a computer system failing, a piece of equipment exploding, etc.).

However, different persons of different backgrounds (i.e., formal education, experience, residence, culture, etc.) are likely to respond to a same disaster event in different manners. For example, a geologist who grew up in California is likely to respond to an earthquake of 2.0 magnitude (on the Richter scale) differently from an accountant who has lived his entire life in Florida. That is, the geologist knows the difference between a mild and severe earthquake based on her training and background, while the accountant likely would not.

The present invention therefore distinguishes between such disparate reporting sources when using their reports to adjust equipment such as the depicted equipment 255 in FIG. 2.

For example, assume that equipment 255 is a pressure vessel within a refinery. Assume further that person 202 is a timekeeper working within the refinery when he hears what he perceives to be an unusual sound coming from the pressure vessel. The timekeeper (person 202) may send a message (e.g., via e-mail) to the control system 201, which may be many miles away from the person 202 and the refinery. Using a process described herein, the control system 201 will adjust (and/or ignore) the content of the message from the person 202 upon determining that the person 202 likely does not understand the nature of the sound coming from the pressure vessel (due to his lack of training/experience in the field of petrochemical processing). In this scenario, the control system 201 would not issue a command to shut down or otherwise adjust the operation of the pressure vessel (equipment 255).

However, if the person 202 is an operator working within the refinery when he hears what he perceives to be an unusual sound coming from the pressure vessel, and sends message 208 (e.g., via e-mail) to report this event to the control system 201, then the control system 201 will not adjust the content of the message, since it has determined that the operator (person 202) likely does understand the nature of the sound coming from the pressure vessel (due to his wealth of training/experience in the field of petrochemical processing). In this scenario, the control system 201 would issue a command to shut down or otherwise adjust the operation of the pressure vessel (equipment 255) based on the content of electronic message 208.

Thus, FIG. 2 presents a control system 201, a message receiver (transceiver 223) within the control system 201, and an equipment device (equipment 255) communicatively coupled to the control system 201 by the message transceiver 223. The message transceiver 223 receives an electronic message from a person (e.g., person 202). The electronic message is a report regarding an emergency event, which may be directly caused by the equipment 255 (i.e., a failure within the equipment 255), or may be caused by the environment (e.g., natural disasters such as flooding or technological disasters such as a nearby fire caused by a failure of other equipment), or may be caused by human failure (e.g., an operator or other person improperly operating the equipment 255).

The control system 201 identifies a profile (stored in profile database 210) for person 202 who sent the electronic message, including his/her education, experience, work history, etc., and determines a bias of the person 202 regarding the emergency event based on the profile of the person 202. That is, the control system 201 determines how trustworthy the report from the person 202 is. Based on the bias of the person, the control system 201 amends a content of the electronic message 208 to create a modified electronic message regarding the emergency event.

The control system 201 then consolidates the modified electronic message with other modified electronic messages (e.g., from other persons 212/214 using the other reporting devices 251b-251n) into a bias-corrected report about the emergency event. The control system 201 then sends a message to the local controller 257 (which may be integral to the equipment 255) to automatically adjust the equipment device (equipment 255) based on the bias-corrected report about the emergency event.

In one or more embodiments of the present invention, one or more biometric sensors (e.g., biometric sensor 204) generate biometric readings that describe a real-time physiological state of the person 202 who sent the electronic message. The control system 201 then further amends the modified electronic message based on the biometric readings that describe the real-time physiological state of the person 202 who sent the electronic message.

Biometric sensor 204 monitors biometrics of person 202. Examples of biometric sensor 204 include, but are not limited to, a blood pressure/pulse monitor (e.g., a pressure/sound sensor that detects the pulse and/or blood pressure of the holder of an electronic device such as a smart phone), a skin sensor (e.g., a resistance sensor that measures a galvanic skin response from the user/holder sweating while holding an electronic device such as a smart phone), a pyloerection detector (e.g., a sensor of hair follicle muscle contraction and a change in hair angles on the skin), an eye/pupil dilation detector (e.g., used with a camera, not shown, to capture an image of the user/holder's eye pupils to indicate various emotions that are known to be associated with pupil dilation and/or pupil contraction, swollen eyelids, etc.), a thermometer (that measures the body temperature of the user 202), a microphone (e.g., to detect a breathing pattern of the holder of an electronic device such as a smart phone), an electroencephalogram (EEG) machine used to generate a representation of electrical activity of the brain (e.g., to indicate a state of deep sleep, light sleep, disturbed sleep, wakefulness, etc.), etc. Thus, biometric sensor 204 is an electronic device that gathers biometric data associated with a human such as person 202. Biometric data is data that describes a medical state of person 202 (e.g., illness), a physiological movement of a person (e.g., eye movement), a cognitive state of a person (e.g., sleepy or alert), a physiological condition of a person (e.g., sweating, increased blood pressure, etc.), etc.

Thus, based on the biometric readings taken by the biometric sensor 204, the control system 201 adjusts reports from person 202 accordingly. For example, if the biometric sensor 204 indicates that the person 202 is anxious (due to being new on the job, taking medications, etc.), then the control system 201 may determine that reports from person 202 are likely to be over-reactive, and will modify the report from the person 202 and/or the response by the control system 201 to the report accordingly. However, if the biometric sensor 204 indicates that the person 202 is hypo-reactive (due to being sleep deprived, taking other medications, etc.), then the control system 201 may determine that reports from person 202 are likely to be under-reactive, and will modify the report from the person 202 and/or the response by the control system 201 to the report accordingly.

In one embodiment of the present invention, a correlation is made between the report from the person 202 and a sensor 206 that monitors the equipment 255. Continuing with the example of the pressure vessel, assume that sensor 206 is an electronic pressure sensor that detects the internal pressure of equipment 255 (a pressure vessel). If the person 202 sends a report to the control system 201 stating that the pressure vessel is making sounds that indicate that the pressure vessel is about to explode, but sensor readings from sensor 206 indicate nominal pressures within the pressure vessel, then (assuming that there are redundant sensors and/or other reasons for the control system to trust the sensor 206 over the person 202) the control system 201 will adjust the message from the person 202. For example, the report may have been "The pressure vessel is about to explode!" Based on nominal readings from the sensor 206, however, the control system may modify the message to read "The pressure vessel is making unusual noises." This modified message is more appropriate, and will be handled accordingly (e.g., by inspecting the pressure vessel for leaks, etc.).

However, if the message from person 202 ("The pressure vessel is about to explode!") tracks with pressure readings that are nearing failure levels, then the report from the person 202 is confirmed, and the control system 201 will automatically send a message to the local controller 257 to take steps (e.g., releasing a pressure valve and/or shutting off feedstock to the pressure vessel) to avoid the disaster.

In accordance then with one or more embodiments of the present invention, the transceiver (e.g., transceiver 223 shown in FIG. 2) receives a signal from a sensor (e.g., sensor 206 shown in FIG. 2) on a unit of equipment (e.g., equipment 255), and the control system 201 responds according when issuing directions to the local controller 257.

For example, assume that equipment 255 is a power distribution station. If the load on the power distribution station exceeds a certain total wattage, then high-voltage trunk lines ("sub-operations") may be disabled by the local controller 257 in response to directions from the control system 201, thereby protecting the overall power distribution station.

In another example, assume that equipment 255 is a server. The sensor 206 may detect what percentage of CPU, bus, network, etc. bandwidth is being consumed at any point in time. A message from the person 202 may state "The server is about to crash!" However, if sensor 206 (e.g., a set of internal sensors within the server) indicates that conditions are normal, then the message is adjusted to "My computer is running improperly", which is then handled by an information technology (IT) professional accordingly.

In another example, assume that the equipment 255 is a fluid pump, and the sensor 206 detects what percentage of maximum capacity (e.g., gallons per second) that the fluid pump is operating at when pumping fluid such as crude oil, chemicals, water, etc. Only if the message from the person 202 and readings from the sensor 206 are in accord (e.g., indicating an overloading of the pump) will the local controller 257 be directed by the control system 201 to slow down the pump and/or reroute fluids to other pumps. However, if the person 202 has been previously granted authority to issue directives regarding the operation of equipment 255 regardless of any readings by sensor 206 (which may have failed/malfunctioned), then the electronic message 208 from person 202 will be used to control the equipment 255, even if the output from sensor 206 is contrary to the directive found in electronic message 208 from person 202.

Figure 3:
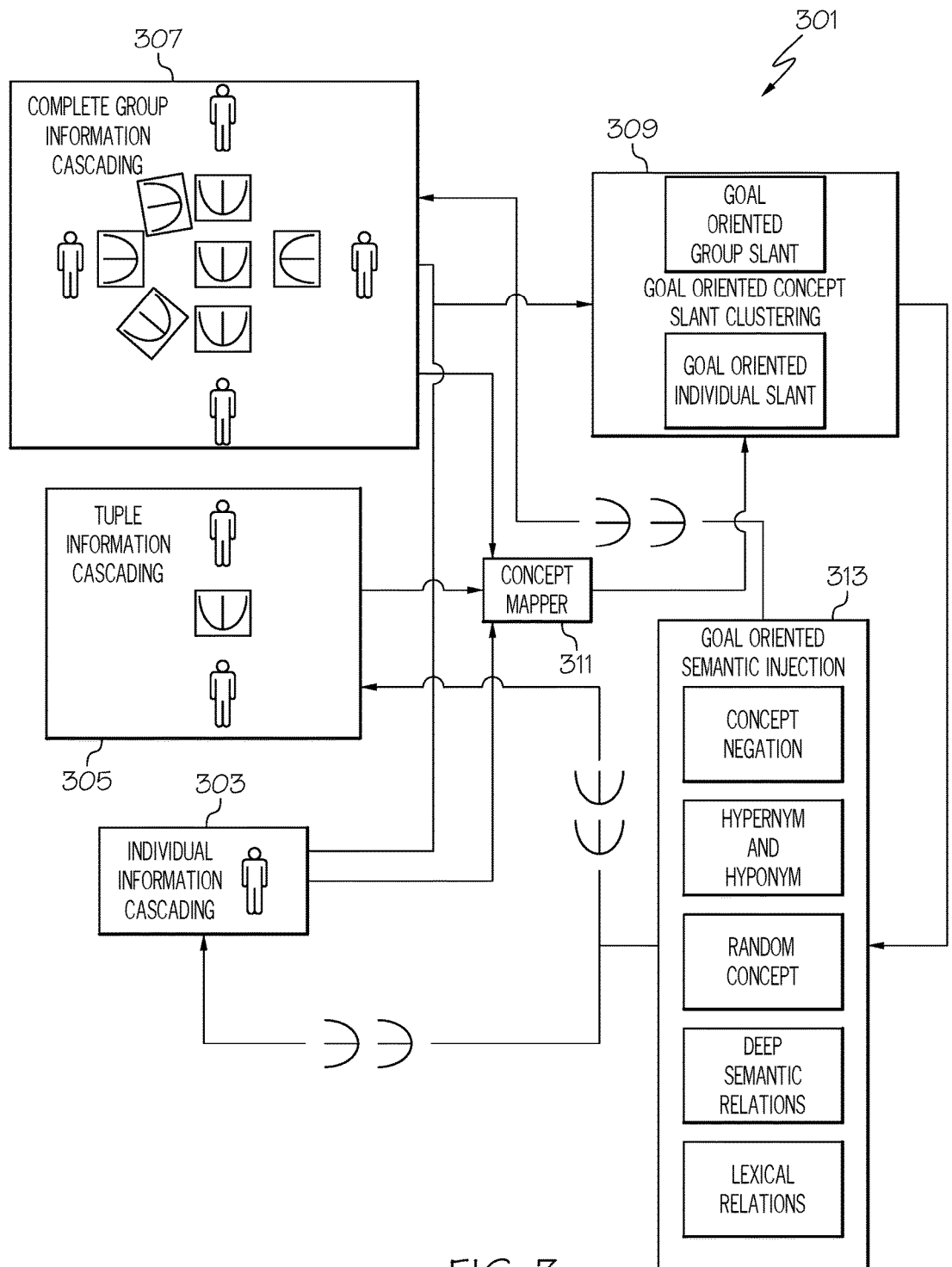
FIG. 3 depicts a high-level flow-chart of a process for controlling equipment based on received reports.

With reference now to FIG. 3, a high-level flow-chart 301 of a process for controlling equipment based on received reports is presented.

A single person, represented by individual information cascading block 303, two or more persons, represented by tuple information cascading block 305, and/or a complete cohort of persons, represented by complete group information cascading block 307, generate messages about a disaster event.

Salient concepts from these messages are extracted by a concept mapper 311 (analogous to computer 101 shown in FIG. 1), which summarizes the messages and correlates their content with an end goal or desired outcome (e.g., accurately controlling equipment) represented by the goal oriented concept slant clustering block 309. In parallel, the conversation information cascades (messages) are directly streamed to the goal oriented concept slant clustering block 309. Each individual's sentiment about an extracted concept is measured, thus yielding group, tuple, and individual goal oriented slants. The slant annotations are then pushed to a goal oriented semantic injection block 313, which represents an information pipeline that generates concepts that are related to the end goal. The semantic information is streamed into each of the information cascades (elements 303, 305, 307), thus effectively engineering a new information cascade for an individual, tuple of individuals or the entire group.

Within the context of an emergency, individuals are clustered around concepts. The epicenter of each cluster is measured by the degree of separation between an epicenter and the number edges between a specific emergency bag of words. In one embodiment of the present invention, a cosine similarity score is combined as a measure to yield an average between nodes within an ontology and distances between bags of words. Thus, multiple clusters can be annealed into a single cluster, which is then fit with a Gaussian function.

Once the reports about the emergency event are received from the various persons (including person 202 shown in FIG. 2), their reports are presented on a display. In one embodiment, the reports are associated with avatars, thereby affording a quick visualization of the reports and their content.

Figure 4:
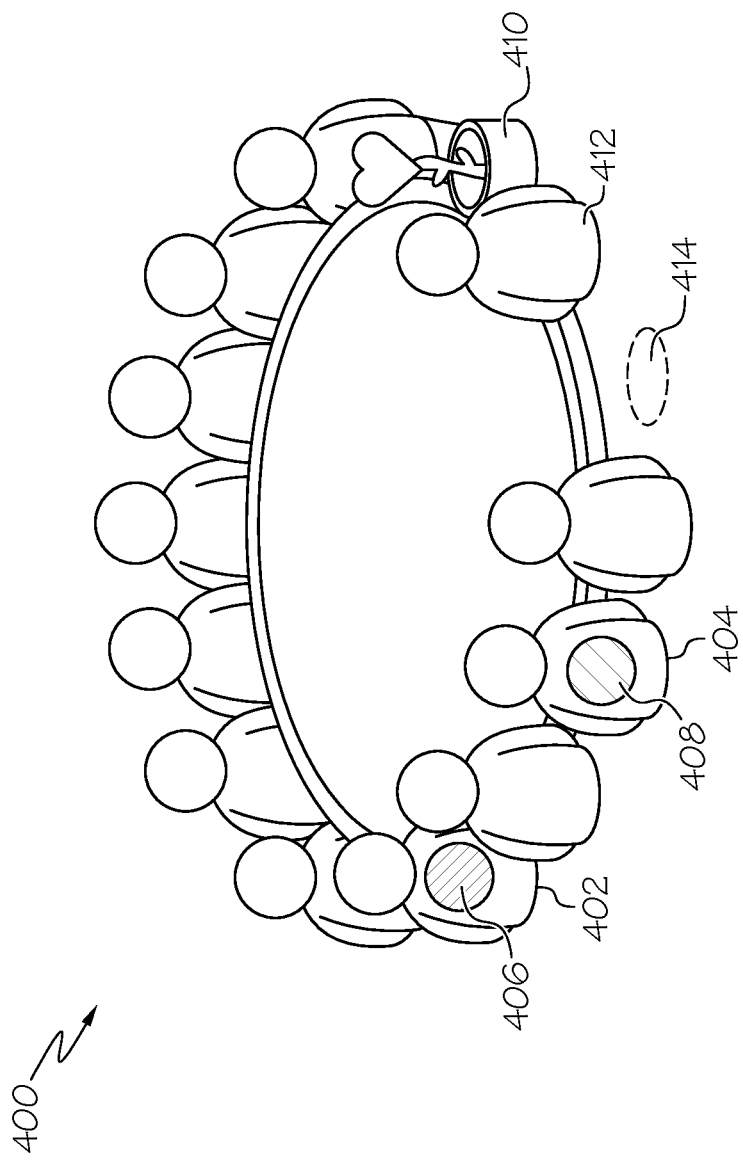
FIG. 4 illustrates a display of avatars in accordance with one or more embodiments of the present invention.

For example, consider now FIG. 4, which illustrates a display of avatars in accordance with one or more embodiments of the present invention. Assume that avatars 402, 404, and 412 are three of the avatars shown in display 400. Assume further that avatars 402, 404, and 412 have all sent reports about an emergency/disaster event to an entity (e.g., an engineering group) or device (e.g., control system 201) reporting a particular disaster event. However, due to their disparate backgrounds, each person represented by 402, 404, and 412 has sent a message about the disaster event that has a different tone and/or content.

For example, the person associated with avatar 402 may have sent a message to a control system stating that there has been a mild tremor within a worksite. A color-coded sphere 406 positioned next to avatar 402 will indicate that this person's report is not alarming. The avatar 402 may be designed to depict the person herself, or her occupation/ background (e.g., a hardhat on the avatar's head indicating that she is a seismologist).

However, the person associated with avatar 404 has sent a message indicating that the worksite tremor was intense, and that lives are at risk. The color-coded sphere 408 next to the avatar 404 indicates that this person's report is dire. However, the avatar 404 is designed to depict a person who is not trained in seismology (e.g., is depicted as a food service worker). Thus, although the message itself is not altered by the system (as indicated by the color-coded sphere 408), the person associated with the color-coded sphere 408 (and thus his report) is discounted, particularly since the flower icon 410 (representing the message from the person represented by avatar 412) is also indicative of a seismic event that is minimal.

Note that chair 414 is empty, thus suggesting that the person represented by an avatar that normally sits in that chair 414 is missing and/or has not submitted a report. This empty chair 414 may be indicative of a serious event, particularly if the person whose avatar should be in the chair 414 works in the area that is most vulnerable (e.g., an older building) to the disaster event at hand (e.g., an earthquake).

Thus, display 400 visually depicts multiple reports about an event as coming from disparate sources (represented by the avatars including avatars 402/404/412), and having different levels of content/urgency (as represented by elements 406/408/410). This allows a user to see at a glance that different reactions to the same event are being reported by disparate persons, and to determine if any persons/reports are missing (in the case of the empty chair 414).

Figure 5:
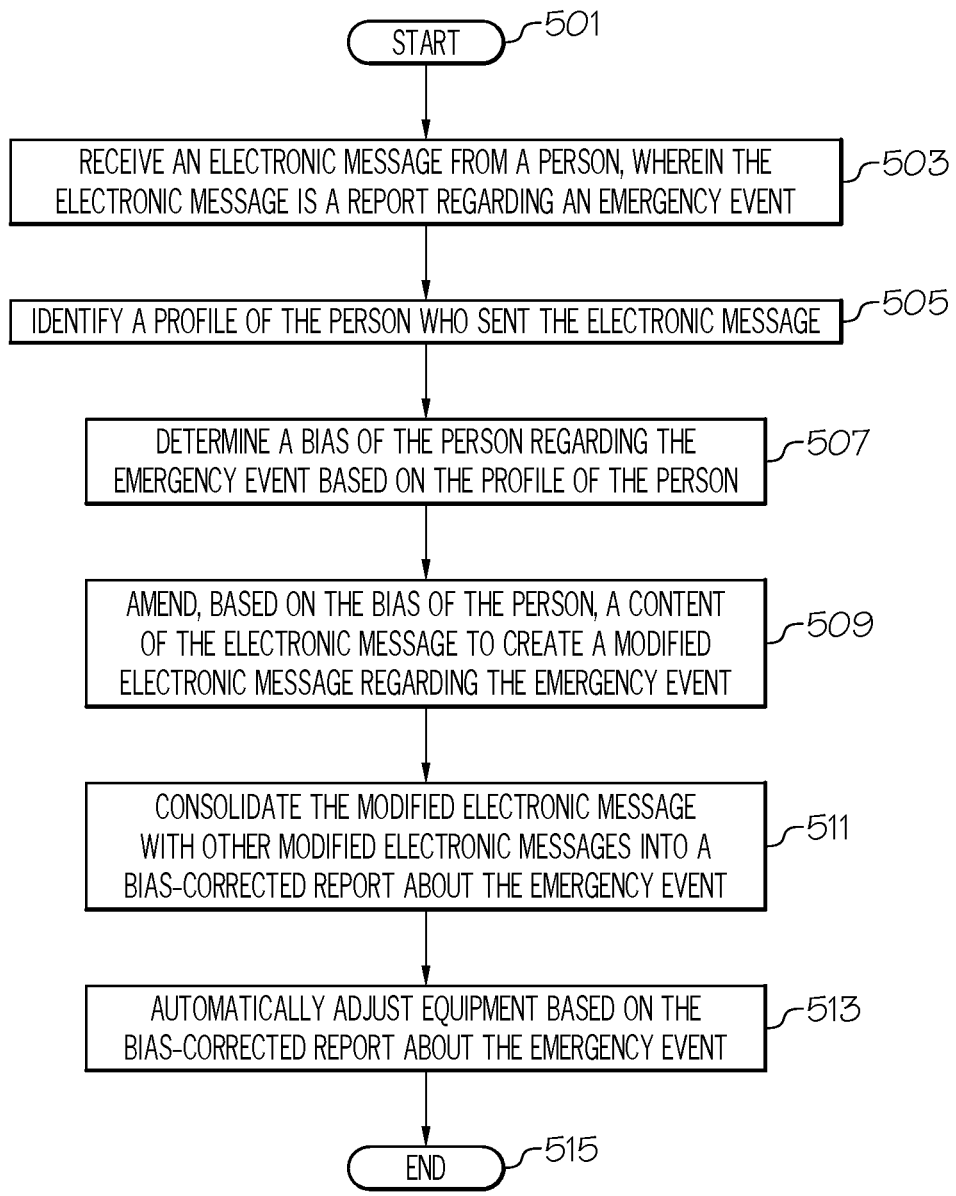
FIG. 5 is a high level flow-chart of one or more operations performed by one or more hardware devices to enhance an emergency reporting system for controlling equipment.

With reference now to FIG. 5, a high level flow-chart of one or more operations performed by one or more hardware devices to enhance an emergency reporting system for controlling equipment is presented.

After initiator block 501, a message receiver (e.g., message transceiver 223 shown in FIG. 2) receives an electronic message (e.g., electronic message 208 shown in FIG. 2) from a person (e.g., person 202 shown in FIG. 2), wherein the electronic message is a report regarding an emergency event, as described in block 503.

As described in block 505, one or more processors (e.g., within the control system 201 shown in FIG. 2) identify a profile of the person who sent the electronic message. For example, the control system 201 shown in FIG. 2 may access the profile database 210 depicted in FIG. 2, which contains profile information about person 202 who sent the electronic message 208. Information within the profile database 210 for the person 202 includes, but is not limited to, the role, educational background, current location, work history, job title and other information relevant to the qualifications of person 202 with regard to providing an accurate report about an event such as a disaster or other emergency event.

As described in block 507, one or more processors then determine a bias of the person regarding the emergency event based on the profile of the person. That is, a bias for that person for that type of emergency event is determined by comparing the profile (e.g., background, role within the enterprise, etc.) of the person with the type of emergency. For example, if the background of the person is such that the system determines that he/she is likely to under-react or over-react to the emergency/disaster event, then the system determines that he/she has a bias (toward over-reacting or under-reacting) to the emergency/disaster.

As described in block 509, based on the bias of the person and a content of the electronic message, one or more processors amend the electronic message to create a modified electronic message regarding the emergency event. For example, if the bias of the person is to over-react to a mild earthquake, and the content of the electronic message includes the message "Because of the earthquake, we must evacuate all facilities immediately!", then the system will amend the electronic message to read "Because of the earthquake, all buildings should be inspected for any structural damage." This modification can be accomplished in multiple ways.

For example, contextual analysis of the content of the electronic message can determine the main subject/topic/ content/tone of the message (e.g., directions to evacuate a location), a tone of the message (e.g., by identifying certain "tone" words and/or punctuation, such as "must" and "!"), and a context of the message (e.g., by identifying the word "earthquake" in the message). That is, the presence of the words "must" and "earthquake" and "evacuate" conveys the content of the electronic message as well as the content/ context of the electronic message, and the punctuation "!" conveys the tone of the electronic message. A rule set may determine that the author of the electronic message is likely to have a bias (e.g., to overreact to a mild earthquake) based on his/her role within the enterprise. Using rules and/or enterprise procedures for responding to an earthquake, the system uses a lookup table of stock sentences that more accurately describe what the message sender should have suggested.

In another example, assume that the person making the electronic report is from a certain geographic area or is part of a certain demographic group, in which certain terms has unique meanings. For example, the term "sweet" may mean "saccharine/sugary" to one demographic group and "highly favorable" to another. Thus, a message that states that there is an unusually "sweet smell" in the air may be intended to convey that there is a pleasant aroma in the air ("highly favorable"), while the recipient of the message may interpret the message as indicating that there is a sugary odor in the air indicative of the presence of a toxic gas (e.g., hydrogen cyanide). Based on the profile of the creator of the electronic message, the term "sweet smell" may be converted into "toxic gas odor" or "pleasant aroma", depending on 1) the role of the message creator, 2) the location of the message creator, and/or 3) the profile of the message creator.

As described in block 511, one or more processors then consolidate the modified electronic message with other modified electronic messages into a bias-corrected report about the emergency event. For example, assume that multiple electronic messages are received from various persons, each having a different bias level. After being modified to remove individual biases, the electronic messages (modified electronic messages) are consolidated into a report, which is now bias-free. For example, reports that are over-reactive as well as under-reactive are first adjusted to remove such over/under-reactive biases, and are then consolidated into a bias-corrected report.

As described in block 513, the bias-corrected report is then used to automatically adjust equipment (e.g., equipment 255 shown in FIG. 2). For example, assume that the bias-corrected report includes directions (based on the crowd-sourced reports that have been bias-corrected) to shut down a pump (equipment 255), since the reports state that the pump has failed, and is now discharging hazardous materials into a local water source. Based on the bias-corrected report about the emergency event (the failed pump discharging toxins), the equipment 255 is automatically adjusted.

The flow-chart ends at terminator block 515.

In a further embodiment of the present invention, the message receiver receives multiple electronic messages about the emergency event from multiple persons. For example, person 202 sends a first electronic message (report) from reporting device 251*a* in FIG. 2, while another person (person 212) sends a second electronic message (report) from reporting device 251*b*, and yet another person (person 214) sends a third electronic message (report) from reporting device 251*n*. One or more processors then order the multiple electronic messages according to determined biases of the multiple persons who sent the multiple electronic messages. For example, assume that person 202 has a high level of expertise about earthquakes, that person 212 has a moderate level of expertise about earthquakes, and that that person 214 has a low level of expertise about earthquakes (where "high", "moderate" and "low" are relative levels either as determined by comparing the relative expertise levels of persons 202/212/214, or by comparing the expertise levels of persons 202/212/214 to a standard level of expertise, both of which are based on the education, experience, etc. of the persons). Thus, the electronic message from person 202 will be ranked highest, followed by the electronic message from person 212, followed by the electronic message form person 214.

Once these bias/expertise levels have been determined and the electronic messages sorted and/or ordered and/or ranked accordingly, the electronic messages are displayed, on an electronic display, according to the determined biases of the multiple persons.

In a further embodiment of the present invention, the electronic message includes a metatag (e.g., metatag 216 shown in FIG. 2 describing the content of the electronic message 208). For example, if the content of the electronic message 208 is about an earthquake at Location X, then the metatag 216 could be "Earthquake, Location X".

One or more processors (e.g., part of the control system 201 shown in FIG. 2) then match this metatag 216 with a news report (e.g., news report 220 shown in FIG. 2) from a news reporting service (e.g., from the mass media news report server 218 shown in FIG. 2). That is, the news service may have a current report about the earthquake at Location X, and has published a news report about this earthquake on its website, with the metatag "Earthquake, Location X" (metatag 222 shown in FIG. 2). By matching metatag 216 to metatag 222, the control system is able to automatically retrieve the news report 220, and/or to incorporate the news report 220 into the bias-corrected report.

In a further embodiment of the present invention, the message receiver (e.g., message receiver 223) detects that that an electronic message came from an unauthorized source. That is, assume that authorized reporting device 251*a* was hacked, and electronic message 208 is an unauthorized message in FIG. 2. However, assume further that control system 201 has information (e.g., from a security system within reporting device 251*a*, a security monitoring system (not shown) that monitors reporting device 251*a* and/or control system 201) indicating that the electronic message 208 is unauthorized. Alternatively, the control system 201 may recognize content in a header or body of the electronic message 208 that is indicative of a hacker (e.g., improper protocol usage, unknown IP address trail, etc.). If the electronic message 208 contains an instruction to adjust the operation of equipment 255 (e.g., to increase its level of operation, to turn it off, etc.), then control system 201 recognizes that equipment 255 is the target of malice. As such, control system 201 will then automatically isolate equipment 255 from any future outside instructions by directing the local controller 257 to refuse any future directive control signals from outside sources. Alternatively, the control system 201 may direct the local controller 257 to continue to trust messages coming from control system 201, but to ignore any messages/instructions/directions coming from any other source.

In a further embodiment of the present invention, biometric readings (e.g., from the biometric sensor 204 shown in FIG. 2) describe a real-time physiological state of the person (e.g., person 202) who sent the electronic message (e.g., electronic message 208). Based on these biometric readings, the electronic message is further modified. For example, assume that biometric sensors 204 show that person 202 is sweating profusely, has body hairs that are "standing on end", and/or has a highly increased heartrate, thus indicating a state of panic in the person 202. As such, the electronic message 208 from person 202 is deemed by control system 201 to be over-reactive, and is adjusted accordingly (as described herein).

In a further embodiment of the present invention, the bias-corrected report is electronically broadcasted, by a message transmitter (e.g., message transceiver 223 in FIG. 2), to a predefined group. For example, assume that the bias-corrected report relates to a natural disaster that occurs in a particular city in which an enterprise has offices. The bias-corrected report may be sent to all employees within that city, thereby providing them instructions (derived from the multiple reporting persons described herein) for responding to the natural disaster (e.g., to vacate buildings, the city, etc.).

In a further embodiment of the present invention, a message receiver (e.g., the message receiver 223 within the control system 201 shown in FIG. 2) receives multiple electronic messages about the emergency event from multiple persons, as in the embodiment just described. However, in this embodiment, rather than merely ranking (i.e., sorting and/or displaying) the different electronic messages according to their biases, the electronic messages are visually coded (e.g., color coded) according to the biases of the persons who sent the electronic messages. Once color-coded, these electronic messages are displayed on an electronic display (e.g., display 109 shown in FIG. 1).

In a further embodiment of the present invention and as presented in FIG. 4, an avatar is created for each of the persons sending in electronic messages that report on and/or make suggestions on how to respond to an emergency event. Each of the visually coded electronic messages (e.g., as represented by a figure such as sphere 406 shown in FIG. 4) is associated with a particular avatar (e.g., avatar 402 shown in FIG. 4), where it is displayed next to the avatar with which it is associated (i.e., with the person who created and sent the electronic message about the disaster/emergency event).

In a further embodiment of the present invention, a message receiver (e.g., message transceiver 223 shown in FIG. 2) receives a location identifier from a communication device (e.g., reporting device 251*a* in FIG. 2) used by the person (e.g., person 202) to send the electronic message (e.g., electronic message 208). The location identifier identifies where the person 202 is currently located through the use of location hardware, such as the GPS device 153 shown in FIG. 1 (assuming that GPS device 153 is within the reporting device 251*a* shown in FIG. 2). One or more processors (e.g., with the control system 201) then adjust the content of the electronic message according to a location of the person who sent the electronic message. For example, if the person (e.g., person 202) is at a location of an explosion within a refinery (as determined by the GPS device 153), then the person may have excellent first-hand knowledge about the extent of the explosion, as compared to another person (e.g., person 212) who is several miles away, but simply heard the explosion. Thus, any reports from person 212 may be modified, particularly if the report includes content that person 212 has merely speculated about (e.g., casualty count, extent of a fire, etc.), since he/she is too far away from the scene to have accurate knowledge about the disaster.

In a further embodiment of the present invention, a person (e.g., person 202 in FIG. 2) is associated with an enterprise (e.g., is an employee of a company). The enterprise is of an enterprise type (e.g., is a company involved in petrochemical refining, is a non-profit involved with working with a disadvantaged population, is a law firm that specializes in corporate transactions, etc.). The profile of the person who sent the electronic message describes a role of the person within the enterprise (e.g., an operator within a refinery that is run by a petrochemical company). In this further embodiment, the content of the electronic message is adjusted according to the enterprise type and the role of the person within the enterprise. For example, if the enterprise type is that of a petrochemical company, and the role of the person is that of an operator, then a report about plant conditions likely needs no modification using the tools described herein. However, if that same person submitted a report regarding health-related issues related to a disaster, then that person likely has no expertise in health care, and his/her report will be adjusted using the tools described herein.

In one or more embodiments of the present invention, social media and similar resources provide crowd-sourced reports, even though such reports come from persons of disparate backgrounds, education, experience, profiles, etc. Thus, different people are affected by disasters in different ways (objectively), and different individuals perceive disaster situations differently (subjectively). The combination of these two factors creates mixtures of biases in the information supplied about the current situation "on the ground". With the system disclosed herein, however, enhancements in preparing for, responding to, and recovering from the threat of bioterrorism, emergent diseases, and other hazards are presented.

In one or more embodiments of the present invention, a standardized system is used to interface individuals with an enterprise. This standardized system uses a standard format for inputting report information about the disaster, and a standard format for inputting the reporting individual's role in the enterprise. Similarly, a standard format is used to input the reporting individual's profile (e.g., experience and training on how to respond to specific types of emergency events).

A relationship system then relates the individuals' roles in the enterprise to their likely subjective biases in reporting a disaster.

A translation system negates these biases in employee reports by modifying the reports, as described herein.

An integration system creates an objective assessment of the disaster situation given bias-corrected reports from corporate employees.

An analytic system generates probabilities of an event-development scenario based on previous incidents.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of enhancing an emergency reporting system for controlling equipment, the method comprising:
   receiving, by a message receiver, an electronic message from a person, wherein the electronic message is a report regarding an emergency event related to equipment;
   identifying, by one or more processors, a profile of the person who sent the electronic message;
   determining, by one or more processors, a bias of the person regarding the emergency event based on the profile of the person;
   amending, by one or more processors and based on the bias of the person, a content of the electronic message to create a modified electronic message regarding the emergency event;
   detecting, by the message receiver, that the modified electronic message came from an unauthorized source; and
   in response to detecting that the modified electronic message came from the unauthorized source, automatically isolating, by a local controller on the equipment, the equipment from remote control signals for controlling the equipment.

2. The method of claim 1, further comprising:
   receiving, by the message receiver, multiple electronic messages about the emergency event from multiple persons;
   ordering, by one or more processors, the multiple electronic messages according to determined biases of the multiple persons who sent the multiple electronic messages; and
   displaying, on an electronic display, the ordered multiple electronic messages according to the determined biases of the multiple persons.

3. The method of claim 1, wherein the electronic message includes a metatag describing the content of the electronic message, and wherein the method further comprises:
   matching, by one or more processors, the metatag with a mass media report, wherein the mass media report is about the emergency event, and wherein the mass media report is from a news reporting agency; and
   automatically retrieving, by one or more processors, the mass media report about the emergency event from the news reporting agency in response to the metatag matching the mass media report.

4. The method of claim 1, further comprising:
   electronically broadcasting, by a message transmitter, the bias-corrected report about the emergency event to a predefined group.

5. The method of claim 1, further comprising:
   receiving, by the message receiver, multiple electronic messages about the emergency event from multiple persons;
   color coding, by one or more processors, the multiple electronic messages for display on a graphical user interface according to determined biases of the multiple persons who sent the multiple electronic messages; and
   displaying the color coded electronic messages on a display.

6. The method of claim 5, further comprising:
   creating, by one or more processors, an avatar for each of the multiple persons;
   associating, by one or more processors, each of the color coded electronic messages with a particular avatar from multiple avatars; and
   displaying the multiple avatars next to associated color coded electronic messages on the display.

7. The method of claim 1, further comprising:
   receiving, by the message receiver, a location identifier from a communication device used by the person to send the electronic message; and
   adjusting, by one or more processors, the content of the electronic message according to a location of the person who sent the electronic message.

8. The method of claim 1, wherein the person is associated with an enterprise, wherein the enterprise is of an enterprise type, wherein the profile of the person who sent the electronic message describes a role of the person within the enterprise, and wherein the method further comprises:
   adjusting, by one or more processors, the content of the electronic message according to the enterprise type and the role of the person within the enterprise.

9. A computer program product for enhancing an emergency reporting system for controlling equipment, the computer program product comprising a computer readable storage medium having program code embodied therewith, wherein the computer readable storage medium is not a transitory signal per se, and wherein the program code is readable and executable by a processor to perform a method comprising:
   receiving, by a message receiver, an electronic message from a person, wherein the electronic message is a report regarding an emergency event related to equipment;
   identifying a profile of the person who sent the electronic message;
   determining a bias of the person regarding the emergency event based on the profile of the person;
   amending, based on the bias of the person, a content of the electronic message to create a modified electronic message regarding the emergency event;
   detecting, by the message receiver, that the modified electronic message came from an unauthorized source; and
   in response to detecting that the modified electronic message came from the unauthorized source, automatically isolating, by a local controller on the equipment, the equipment from remote control signals for controlling the equipment.

10. The computer program product of claim 9, wherein the method further comprises:
    receiving multiple electronic messages about the emergency event from multiple persons;
    ordering the multiple electronic messages according to determined biases of the multiple persons who sent the multiple electronic messages; and
    displaying the ordered multiple electronic messages according to the determined biases of the multiple persons.

11. The computer program product of claim 9, wherein the electronic message includes a metatag describing the content of the electronic message, and wherein the method further comprises:
    matching the metatag with a mass media report, wherein the mass media report is about the emergency event, and wherein the mass media report is from a news reporting agency; and
    automatically retrieving the mass media report about the emergency event from the news reporting agency in response to the metatag matching the mass media report.

12. The computer program product of claim 9, wherein the method further comprises:
  detecting that the electronic message came from an unauthorized source; and
  in response to detecting that the electronic message came from the unauthorized source, automatically isolating the equipment from remote control signals for controlling the equipment.

13. The computer program product of claim 9, wherein the person is associated with an enterprise, wherein the enterprise is of an enterprise type, wherein the profile of the person who sent the electronic message describes a role of the person within the enterprise, and wherein the method further comprises:
  adjusting the content of the electronic message according to the enterprise type and the role of the person within the enterprise.

14. The computer program product of claim 9, wherein the method further comprises:
  receiving multiple electronic messages about the emergency event from multiple persons;
  color coding the multiple electronic messages according to determined biases of the multiple persons who sent the multiple electronic messages;
  creating an avatar for each of the multiple persons;
  associating each of the visually coded electronic messages with a particular avatar from multiple avatars; and
  displaying the multiple avatars next to associated color coded electronic messages on a display.

15. The computer program product of claim 9, wherein the method further comprises:
  receiving a location identifier from a communication device used by the person to send the electronic message; and
  adjusting the content of the electronic message according to a location of the person who sent the electronic message.

16. A system comprising:
  a control system;
  a message receiver within the control system;
  an equipment device communicatively coupled to the control system by the message receiver;
  wherein the message receiver receives an electronic message from a person, wherein the electronic message is a report regarding an emergency event, and wherein the message receiver detects that the electronic message came from an unauthorized source;
  wherein the control system identifies a profile of the person who sent the electronic message;
  wherein the control system determines a bias of the person regarding the emergency event based on the profile of the person;
  wherein the control system amends, based on the bias of the person, a content of the electronic message to create a modified electronic message regarding the emergency event; and
  a local controller on the equipment device, wherein the local controller on the equipment device, in response to the message receiver detecting that the modified electronic message came from the unauthorized source, automatically isolates the equipment device from remote control signals for controlling the equipment device.

17. The system of claim 16, wherein the message receiver receives multiple electronic messages about the emergency event from multiple persons, wherein the control system orders the multiple electronic messages according to determined biases of the multiple persons who sent the multiple electronic messages, and wherein the control system displays displaying the ordered multiple electronic messages according to the determined biases of the multiple persons.

18. The system of claim 16, wherein the electronic message includes a metatag describing the content of the electronic message, wherein the control system matches the metatag with a mass media report, wherein the mass media report is about the emergency event, wherein the mass media report is from a news reporting agency, and wherein the control system automatically retrieves the mass media report about the emergency event from the news reporting agency in response to the metatag matching the mass media report.

19. The system of claim 16, wherein the control system detects that the electronic message came from an unauthorized source and, in response to detecting that the electronic message came from the unauthorized source, automatically isolates the equipment from remote control signals for controlling the equipment.

20. The system of claim 16, wherein the person is associated with an enterprise, wherein the enterprise is of an enterprise type, wherein the profile of the person who sent the electronic message describes a role of the person within the enterprise, and wherein the control system adjusts the content of the electronic message according to the enterprise type and the role of the person within the enterprise.

* * * * *